United States Patent [19]

Hwang

[11] Patent Number: 4,761,631

[45] Date of Patent: Aug. 2, 1988

[54] MAIN BATTERY DISCONNECTION ALARM AND HEADLIGHT WARNING CIRCUIT

[76] Inventor: Shih-Ming Hwang, No. 11, Alley 12, Lane 7, Ching-Tyan St., Taipei, Taiwan

[21] Appl. No.: 49,821

[22] Filed: May 14, 1987

[51] Int. Cl.$^4$ .............................................. B60Q 1/00
[52] U.S. Cl. .................................. 340/52 D; 340/63; 340/384 E; 340/636; 340/692; 340/693; 315/82; 315/83; 307/10 LS; 307/10 BP
[58] Field of Search ................... 340/52 D, 63, 384 R, 340/384 E, 635, 636, 691, 692, 693; 315/82, 83, 77; 387/10 LS, 10 R, 10 AT, 10 BP

[56] References Cited

U.S. PATENT DOCUMENTS

| | | | |
|---|---|---|---|
| 4,193,060 | 3/1980 | Slavix et al. | 340/52 D |
| 4,194,175 | 3/1980 | Eklund | 340/52 D |
| 4,220,947 | 9/1980 | Yamamoto | 340/52 D |
| 4,555,690 | 11/1985 | Fukushima et al. | 340/52 D |

Primary Examiner—Donnie L. Crosland
Attorney, Agent, or Firm—Lowe, Price, LeBlanc, Becker & Shur

[57] ABSTRACT

A main battery disconnection alarm and headlight warning circuit in which the main battery charges and maintains a backup battery in full charge, and when the main battery is disconnected or damaged, the backup battery provides power to an alarm and a control circuit triggers a siren to give warning, and a headlight warning circuit which triggers a siren to give a different warning sound from the main battery disconnection alarm.

3 Claims, 2 Drawing Sheets

MAIN BATTERY DISCONNECTION ALARM AND HEADLIGHT WARNING CIRCUIT

BACKGROUND OF THE INVENTION

There are many kinds of burglar alarms for installation in vehicles. Most of them are powered by the vehicle's main battery, and will not function if said main battery is damaged or disconnected. Moreover, forgetting to turn off the ignition switch or the headlights before leaving the vehicle will deplete the battery, but there may be no warning to the owner of this situation. In view of the above defects, the inventor has created a main battery disconnection alarm and headlight warning circuit.

SUMMARY OF THE INVENTION

The present invention provides a main battery disconnection alarm and headlight warning circuit which uses D1 and R2 to charge and maintain a back-up battery in a fully-charged state; R1, R4, R5, C1, and IC1 to cause IC2 to output "0" when the main battery is operating properly, and to cause IC2 to have an output of "1" when its input is "0,0" within a time determined by R6, R7, and C2 after disconnection of the main battery so that the backup battery provides power to operate a alarm and trigger a siren; and IC7 to give an output of "1", causing IC3 to output "0" to trigger an oscillation circuit composed of IC5, IC4, C7, C6, R20, and R18 if the vehicle's headlights continue to light for a pre-determined period after turning off the ignition switch in order to give a warning distinct from that of the main battery disconnection alarm.

DETAILED DESCRIPTION OF THE PREFERRED EMBODIMENT

The present invention provides a main battery disconnection alarm and headlight warning circuit, in particular a warning system to prevent the cutting off of the vehicle's power source by persons other than the vehicle's owner, and to prevent the vehicle's owner from forgetting to turn off the vehicle's headlights after the vehicle's engine is shut off.

The main battery disconnection alarm and headlight warning circuit, according to the present invention, is characterized by: (1) A backup battery which supplies power to a vehicle alarm system in the case that the vehicle's main battery is disconnected, damaged, or drained of power; (2) an output to a siren which is triggered when the main battery is damaged or disconnected by someone attempting to defeat an alarm system or vandalize the vehicle's electrical system; (3) the alarm system and the headlight warning circuit are powered by the backup battery when the main battery is disconnected or damaged; (4) a warning can be given if the vehicle's headlights are not turned off before leaving the vehicle; and (5) simple installation.

The present invention is described in detail with reference to the attached drawings.

Figure 1:
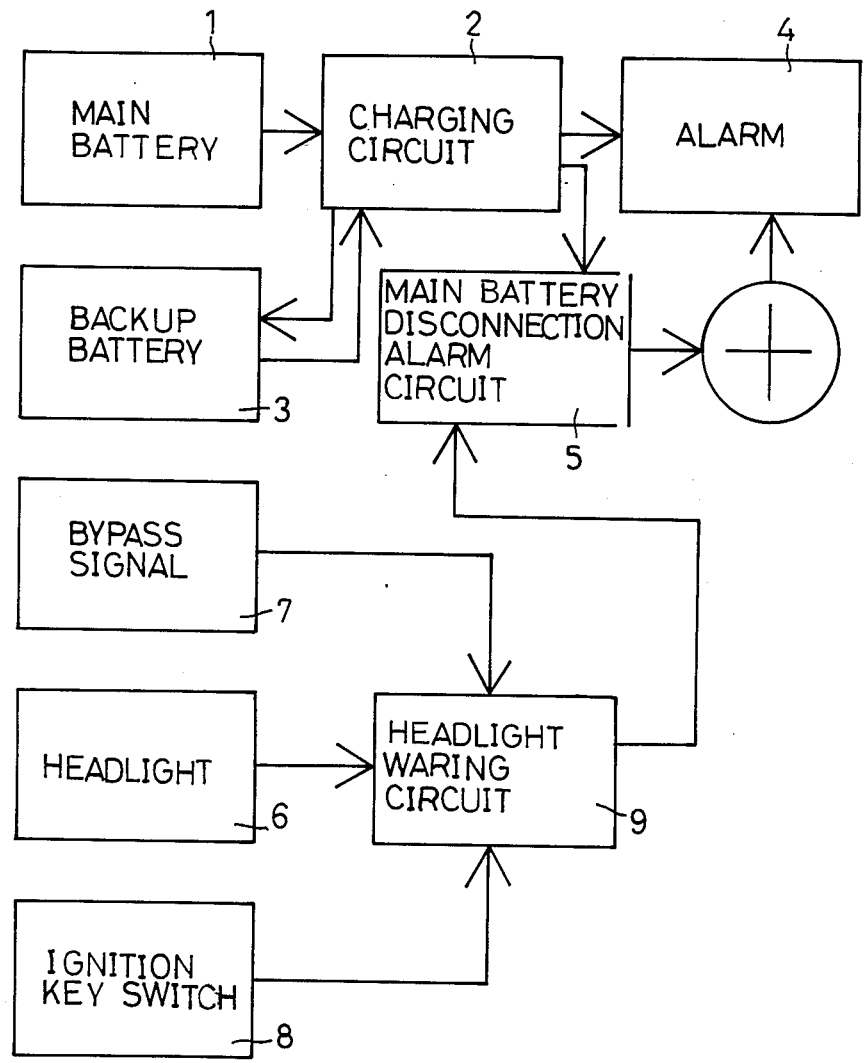
FIG. 1 is a block diagram for a preferred embodiment according to the present invention.

FIG. 1 is a block diagram of a preferred embodiment according to the present invention. As shown in the drawing, the main battery (1) charges the back-up battery (3) via a charging circuit (2) so that the backup battery (3) maintains a full charge as a standby power source to the alarm (4). Normally, the alarm (4) is powered by the main battery (1), but the alarm (4) is powered by the backup battery (3) if the main battery (1) is disconnected or damaged. The present invention includes a main battery disconnection alarm circuit (5) which gives an audible warning using power from the backup battery (3) when the main battery is disconnected or damaged.

Headlight lit signal (6), vehicle ignition key switch (8), and bypass signal (7) are sent to the headlight. warning circuit (9). If the headlights (6) remain lit after a preset time after the vehicle ignition switch is shut off, the headlight warning circuit (9) causes the siren to give a warning signal.

Figure 2:
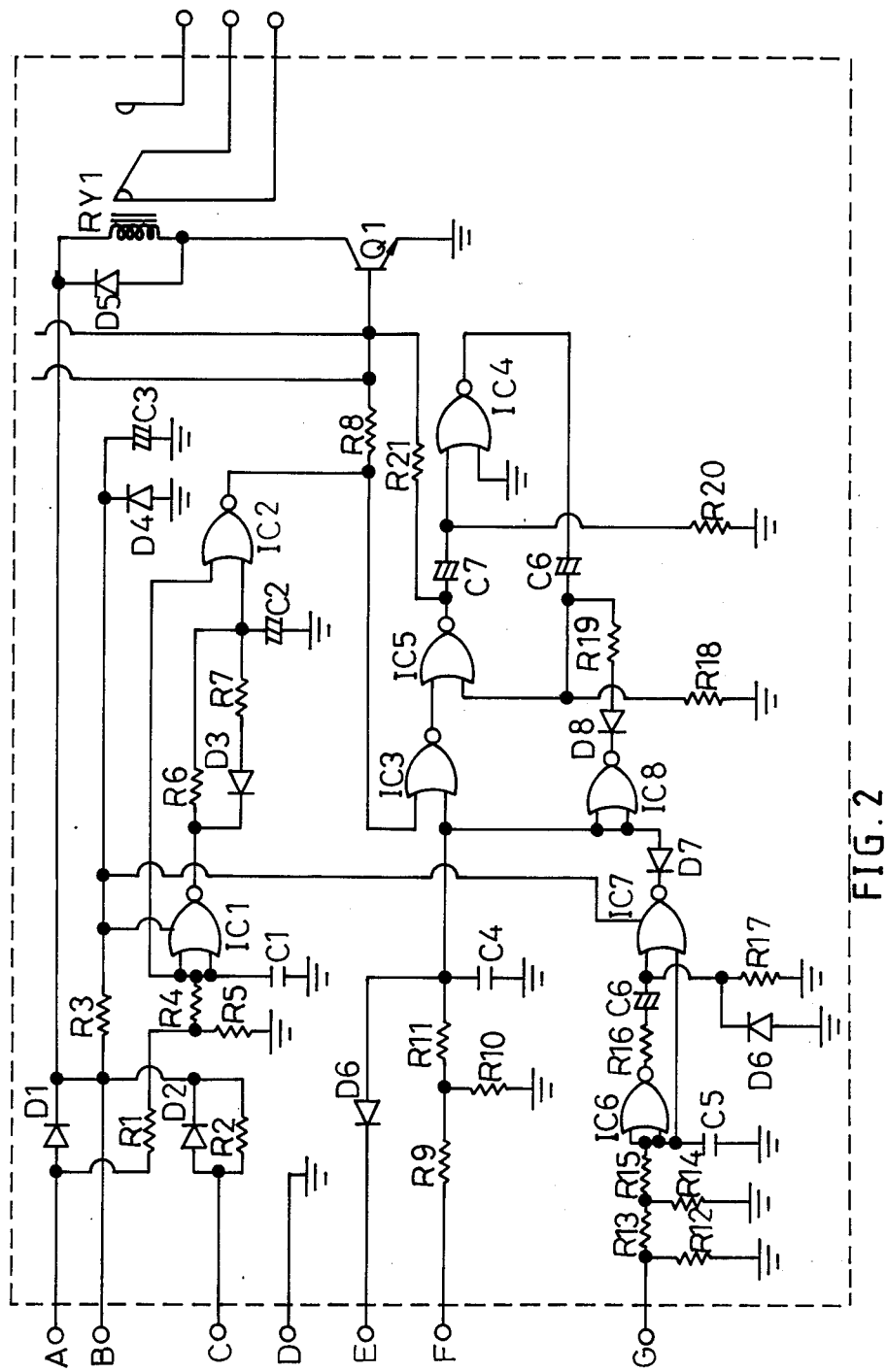
FIG. 2 is a circuit diagram of the preferred embodiment according to the present invention.

FIG. 2 is a circuit diagram for the preferred embodiment of the present invention. As shown in the drawing, point A connects to the positive terminal of the main battery, point B supplies backup power to the vehicle alarm, point C connects to the positive terminal of the backup battery, point D connects the negative terminals of both the main and backup batteries, point E connects to a manually-controlled bypass switch, point F to the headlights, and point G to the ignition key. The main battery can charge and maintain full charge of the backup battery via D1 and R2. The backup battery is of conventional structure and not within the scope of the claim herein. The main battery gives a signal to IC1 and IC2 from R1 via R4. After phase reversing at IC1, then D3, R6, R7, and C2 give a signal to IC2. R7, R6, and C2 compose a delay circuit. After disconnection or damage of the main battery, IC2 will have an input of "0,0" and an output "1" during the time predetermined by R6, R7, and C2. This signal, after phase reversing at IC3, IC5, IC4, C6, C7, R20, and R18, which compose an oscillator, turns on Q1 and RY1 to trigger a siren in order to give a warning signal. RY1 in the present invention connects to a siren which is of conventional structure and not within the scope of the claim herein.

A signal from the headlights is sent to IC3 via R9, R10, R11, and C4. When the ignition switch is in the "off" position, the input at point G is "0". When the ignition switch is in the "on" position, input at point G is "1". After phase reversing at IC6, and under control by the delay circuit, input to IC7 changes to "0,0", and the output becomes "1" after the end of the delay period. When the headlights are lit, input to point F is "1", so that input to IC3 is "0,1", output is "0" and the oscillator composed of IC5, IC4, C7, C6, R18, R19, R20, and D8 turns on Q1 and causes generation of a signal to warn that the headlights have not been turned off. After turning off the headlights, output at point F is "0", so that output of IC3 is "1" and no warning will occur. Point E is a bypass circuit to allow the headlights to be turned on when the ignition key is Off Input of a "0" signal at point E resets R9, R10, R11, and C4 without triggering the alarm. The headlight warning circuit, according to the present invention, gives a series of relatively quiet and short intermittent sounds to prevent noise pollution and to distinguish it from the main battery disconnection warning. The main battery disconnection warning gives a series of longer, full-volume intermittent sounds to threaten would-be burglars.

I claim:

1. A main battery disconnection alarm and headlight warning circuit comprising:

a. a charging circuit composed of D1 and R2 to maintain the backup battery in a full-charge state;

b. a main battery disconnection alarm circuit composed of R1, R4, R5, C1, IC1, R6, D3, R7, C2, and IC2 so that when the main battery is disconnected or damaged, IC2 gives an output "1" which, after oscillation in an oscillator composed of IC5, IC4, C6, C7, R18, and R20, turns on Q1 to drive RY1 to trigger a siren;

c. a headlight warning circuit composed of R9, R10, R11, C4, IC3, IC5, C7, IC4, R12, R13, R14, R15, C5, IC6, R16, C6, D6, R17, IC7, D7, IC8, D8, R18, R19, C6, and R20 to give a warning if the headlights continue to be on for a preset time after turning off the vehicle's ignition switch;

d. a warning circuit composed of Q1, RY1, and D5 to turn on and turn off a siren in such a manner that when the main battery is disconnected or when the headlights are not turned off within a preset time after turning off of the ignition switch, an audible warning signal is given; and characterized by the distinction between the main battery disconnection warning and the headlight warning signal in such a manner that the main battery disconnection signal is a series of short, relatively quiet intermittent tones, and the headlight warning signal is a series of longer, relatively loud intermittent tones; characterized by the distinction between the main battery disconnection warning and the headlight warning signal in such a manner that the main battery disconnection signal is a series of longer, relatively loud intermittent tones, and the headlight warning signal is a series of short, relatively quiet intermittent tones.

2. A main battery disconnection alarm and headlight warning circuit as claimed in claim 1 wherein the headlight warning circuit gives an output "0" at point G when the vehicle's ignition switch is in the "off" position, and, after phase reversing at IC6 and a time delay as predetermined by C6 and R17, IC7 gives an output "1" with input "0,0", IC3 has an input "0,1" with output "0" when the headlamps are lit, which, after oscillation in an oscillator composed of IC5, IC4, C7, C6, R18, R19, R20, and D8, turns on Q1 via R21 to give a series of short, relatively quiet intermittent tones via a siren to prevent noise pollution.

3. A main battery disconnection alarm and headlight warning circuit as claimed in claim 1 wherein the main battery disconnection circuit uses IC2 to give an output "1" with input "0,0" within a preset time as determined by R6, R7, and C2, D3, and, after phase reversing at IC3 and oscillation by an oscillator composed of IC5, IC4, C6, C7, R20, and R18, gives a series of longer, full-volume intermittent tones via a siren.

* * * * *